United States Patent [19]
Jackson et al.

[11] Patent Number: 5,378,447
[45] Date of Patent: Jan. 3, 1995

[54] METHOD FOR THE PREPARATION OF CHLORATES FROM WASTE GAS STREAMS OBTAINED FROM THE PRODUCTION OF CHLORINE DIOXIDE

[75] Inventors: John R. Jackson; Charles L. Pitzer, both of Wilmington, N.C.; Charles O. Buckingham, Storrington Township, Canada

[73] Assignee: Huron Tech Corp., Delco, N.C.

[21] Appl. No.: 148,356

[22] Filed: Nov. 8, 1993

Related U.S. Application Data

[63] Continuation of Ser. No. 924,546, Jul. 31, 1992, abandoned.

[51] Int. Cl.$^6$ ............................................. C01B 11/14
[52] U.S. Cl. ................................... 423/475; 423/478; 423/479; 423/240 R; 204/95
[58] Field of Search .......... 423/475, 478, 479, 240 R; 204/95

[56] References Cited
U.S. PATENT DOCUMENTS

| | | | |
|---|---|---|---|
| 388,217 | 8/1888 | Muspratt | 423/475 |
| 3,690,845 | 9/1972 | Grotheer | 423/475 |
| 3,984,523 | 10/1976 | Schäjer et al. | 423/240 R |
| 4,159,929 | 7/1979 | Grotheer | 204/95 |
| 4,175,038 | 11/1979 | Sakowski | 210/62 |
| 4,216,195 | 8/1980 | Jaszka et al. | 423/478 |
| 4,961,918 | 10/1990 | Norell et al. | 423/478 |

FOREIGN PATENT DOCUMENTS

| | | | |
|---|---|---|---|
| 19189 | 7/1895 | United Kingdom | 423/475 |
| 1175352 | 12/1969 | United Kingdom | 423/475 |

Primary Examiner—Gary P. Straub
Assistant Examiner—N. M. Nguyen
Attorney, Agent, or Firm—Andrew E. Pierce

[57] ABSTRACT

A process is disclosed for producing a dilute solution of an alkali or alkaline earth metal chlorate from a chlorine and carbon dioxide waste gaseous stream. The process of the invention can be combined in a continuous process for the production of an alkali or alkaline earth metal chlorate for use in a chlorine dioxide generator for the production of chlorine dioxide in which the waste gaseous stream from the chlorine dioxide generator is converted to a dilute solution of an alkali or alkaline earth metal chlorate and passed to an electrochemical cell for the generation of an alkali or alkaline earth metal sodium chlorate, the product of the electrochemical cell being in turn passed to the chlorine dioxide generator.

14 Claims, 3 Drawing Sheets

METHOD FOR THE PREPARATION OF CHLORATES FROM WASTE GAS STREAMS OBTAINED FROM THE PRODUCTION OF CHLORINE DIOXIDE

This is a continuation of copending application Ser. No. 07/924,546 filed on Jul. 31, 1992, now abandoned.

BACKGROUND OF THE INVENTION

1. Field of the Invention

This invention relates, generally, to the utilization of waste gas streams containing chlorine and carbon dioxide and, particularly, to waste gas streams produced during the production of chlorine dioxide by the reaction of an alkali or alkaline earth metal chlorate with a reducing agent.

2. Description of the Prior Art

Chlorine dioxide is an oxidation agent and an important bleaching agent in the pulp industry where it is the most common bleaching agent used in the final stages of pulp bleaching. Recently, there has been an increased use of chlorine dioxide instead of other bleaching agents especially sodium hypochlorite and chlorine. It is known that the use of chlorine in bleaching pulp, lead to the production of dioxins which are released to the environment in the disposed wastes. Sodium hypochlorite solutions, when used in bleaching pulp, lead to the formation of chloroform which cannot be tolerated in the paper industry at any concentration. Accordingly, there is a decreased use of chlorine and sodium hypochlorite as bleaching agents in the wood pulp industry.

Methods formerly used for the preparation of chlorine dioxide by reduction of sodium chlorate can be summarized in the following gross formulas:

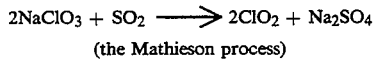

(the Mathieson process)

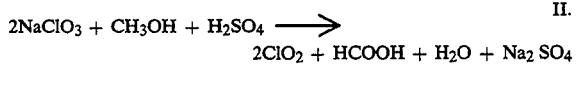

(the Solvay process)

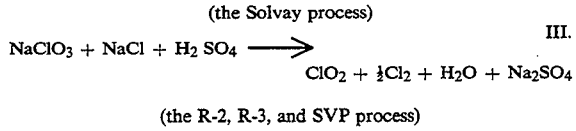

(the R-2, R-3, and SVP process)

Thus, the reducing agent in these processes is sulphur dioxide, methanol and chloride ion respectively. Other reducing agents, such as chromic acid or nitrogen oxides have also been tested, but, principally, due to their higher prices they have not been commercially utilized to a considerable degree.

A modern method for chlorine dioxide production is as follows:

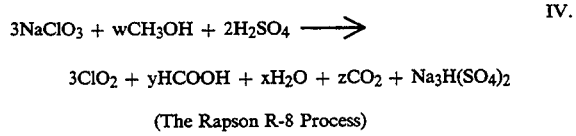

(The Rapson R-8 Process)

All these processes take place with an excess of a strong acid, usually sulfuric acid. In process for the production of chlorine dioxide in which sulfuric acid is used, the spent liquor or saltcake of the reactor will consist of sodium sulphate and/or strong sulfuric acid or, if desired, sodium hydrogen sulphate in strong sulfuric acid. The gases carbon dioxide and possibly some chlorine are produced in the Rapson R-8 process. Passage of these gases through a sodium hydroxide scrubber produces an aqueous liquor stream of sodium chloride, sodium hypochlorite and sodium carbonate. It is essential from an economical as well as an environmental point of view that this liquor be utilized. However, this waste stream cannot be used because of the generation of chloroform from the sodium hypochlorite formed during the scrubbing of chlorine with sodium hydroxide in the wood pulp bleaching process.

The process of reacting chlorine with caustic to made sodium chlorate has been known for over 100 years. Under alkaline conditions chlorine reacts with caustic to make sodium hypochlorite:

 V.

Under approximately neutral conditions, sodium hypochlorite reaches an equilibrium with hypochlorous acid and forms sodium chlorate:

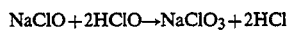 VI.

Making sodium chlorate this way is generally not practiced because it is cheaper to make sodium chlorate by the direct electrolysis of salt:

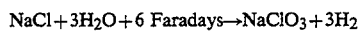 VII.

Presently, caustic is used to remove chlorine from tail gas streams from sodium chlorate, chlorine or chlorine dioxide plants according to reaction V. The resulting sodium hypochlorite solution has typically been a useful chemical in such applications as pulp bleaching, and the pulp and paper industry has always provided a useful market for this chemical.

Sodium hypochlorite is being phased out of wood pulp bleaching because it forms chloroform on the pulp. This poses a particularly severe problem in the generation of chlorine dioxide because, whereas tail gases from sodium chlorate and chlorine plants contain only trace amounts of chlorine, chlorine dioxide generators of the R2, R3, and SVP type produce 0.6–0.7 lb of chlorine per lb of chlorine dioxide and frequently the concentration of chlorine in the tail gases is over 70%. Further contributing to the problem is the trend in the pulp and paper industry to increase chlorine dioxide production because chlorine dioxide has been shown to reduce formation of dioxin and chlorinated organics when substituted for chlorine in the pulp bleaching process.

Any NaCl which enters a chlorine dioxide generator results in an equivalent amount of $Cl_2$ by-product. To address this concern pulp and paper mills are switching to a new type of chlorine dioxide generator which uses methanol as the reducing agent instead of NaCl, thereby producing $CO_2$ as a by-product rather than $Cl_2$. However some by-product chlorine can still be produced from generator inefficiency or decomposition, or from any salt present in the sodium chlorate feed. For example, sodium chlorate from solution sodium chlorate plants would contain 0.1–0.3 moles of NaCl per mole of $NaClO_3$. Also, although claims are made that the use of methanol as a reducing agent in chlorine dioxide generators allows the omission of chloride ion in the sodium chlorate feed, it is well documented that their operation is more stable if some chloride ion is present.

Chlorine resulting from any of these reasons can end up in the chlorine dioxide generator chlorine tail gas scrubber where it will be removed according to reaction V. However, by-product $CO_2$ from the methanol will also be scrubbed according to reaction VIII below thus creating a scrubber effluent which is no longer a simple sodium hypochlorite solution, but rather a mixture of sodium hypochlorite and sodium carbonate.

$$CO_2 + 2NaOH \rightarrow Na_2CO_3 + H_2O \qquad \text{VIII.}$$

Since these sodium hypochlorite solutions are no longer desirable pulp bleach chemicals, they have to be dealt with in other ways. An obvious approach is to neutralize the solutions with acid so the sodium hypochlorite will convert to sodium chlorate according to reaction VI, and then reprocess the resulting sodium chlorate solution in the chlorine dioxide generators or in any available sodium chlorate plant. However the presence of sodium carbonate in the solutions makes this approach impractical by any conventional means because the neutralization process will drive off the sodium carbonate as $CO_2$ which causes several problems which render prior art processes unusable:

(a) The liberated $CO_2$ will contain high levels of chlorine and/or sodium hypochlorite and will therefore have to be scrubbed, but any conventional scrubber will also remove the $CO_2$ as sodium carbonate thereby creating a closed system where sodium carbonate will build up to the saturation point and eventually shut down the process.

(b) The tiny bubbles of $CO_2$ forming in the solution cause severe foaming which renders most conventional reactors unusable.

(c) The sodium carbonates will consume expensive acid and yield only low value sodium chloride salt according to reaction IX. below:

$$Na_2CO_3 + 2HCl \rightarrow CO_2 + 2NaCl + H_2O \qquad \text{IX.}$$

In a similar fashion, sodium carbonate could also build up over time from chlorine tail gas scrubbers in sodium chlorate, chlorine or water treatment plants, or any other process where chlorine is used, because of $CO_2$ coming from the atmosphere, floor washings or from a brine purification area. Therefore a system is needed which will treat any chlorine tail gas or sodium hypochlorite solution in such a way that unwanted $CO_2$ or sodium carbonate will be separated and purified of entrained chlorine or sodium hypochlorite compounds such that the unwanted $CO_2$ can be safely discharged from the process, and the sodium hypochlorite and/or any free alkalinity in the effluent will be converted to a usable sodium chlorate solution suitable for reprocessing even in a closed loop system.

Ninety-five percent of the sodium chlorate produced is used in the pulp and paper industry to manufacture chlorine dioxide. Chlorine dioxide has been shown not to produce dioxins and other chlorinated organics when substituted for chlorine in the pulp bleaching process. Accordingly, the use of chlorine for bleaching with pulp has been sharply reduced and the demand for chlorine dioxide in the pulp and paper industry has risen rapidly over the past few years. Since chlorine dioxide is made by reducing an aqueous solution of sodium chlorate, as indicated above, pulp mills have two options for supplying chlorine dioxide generators with an aqueous solution of sodium chlorate: (1) purchase sodium chlorate crystal and obtain shipment thereof via railcar or truck and (2) manufacture an aqueous solution of sodium chlorate on the site of the pulp mill. The advantages of manufacture of an aqueous solution of sodium chlorate at the pulp mill are well documented in the literature. Most of the advantages to be obtained are the result of the ability of pulp mill sodium chlorate manufacturing facilities to prepare the aqueous sodium chlorate solution at the proper concentration and quality desired so as to properly feed the chlorine dioxide generators directly. This procedure eliminates crystallizing the sodium chlorate, shipping, unloading, and handling the sodium chlorate which would be otherwise purchased from off-site manufacturers. With pulp mill sodium chlorate requirements ever increasing, the advantages of on-site sodium chlorate solution manufacture are greater than ever.

Alkali metal chlorate, and in particular sodium chlorate has been produced by the electrolysis of aqueous solutions of alkali metal chlorides, such as sodium chloride, in electrolytic cells equipped with or without membranes or diaphragms. Typically, electrolytic cells make sodium chlorates within the cell by reacting chlorine produced at the anode with sodium hydroxide produced at the cathode. One such representative electrolytic cell of this type is shown in U.S. Pat. No. 3,732,153 by C. J. Harke et al. Various other arrangements of both electrochemical and combinations of electrochemical and chemical methods for manufacturing sodium chlorates have also been proposed, such as the use of a two compartment permselective membrane equipped electrolytic cell operating in conjunction with a diaphragmless-type electrolytic sodium chlorate cell. This method is disclosed in U.S. Pat. No. 3,897,320 to E. H. Cook. However, to obtain improved current efficiencies and significant reductions in electrical power requirements in the production of inorganic sodium chlorate, U.S. Pat. No. 3,464,901 provides for the electrochemical preparation of chlorine and caustic soda in a diaphragm type chloralkali cell. The caustic soda containing unreacted alkali metal chloride and alkali metal chlorate is then removed from the cell and mixed and chemically reacted with chlorine from the anolyte of the cell. The chemical reaction is carried out at a pH of 6 to 8 to convert the sodium hypochlorite to sodium chlorate. However, in order to maintain the conditions most favorable for converting sodium hypochlorite to sodium chlorate, additional caustic and/or acid over and above that supplied by the cell has to be added to the reaction mixture. In the case of Japanese Pat. No.792,025 dilute chlorine is reacted with less than 20 percent caustic soda to produce a concentrated sodium hypochlorite solution with sufficient caustic remaining in it to produce a pH of 8 to 10. The solution is subsequently diluted from about 13 to 15 percent sodium hypochlorite to 6 to 8 percent sodium hypochlorite with a recycled stream of sodium chloride and sodium chlorate. The diluted stream is then acidified with hydrochloric acid to a pH of about 6.0 and finally fed to an electrolysis cell.

In U.S. Pat. No. 4,175,038 to Sakowski, a process is disclosed for reducing the available chlorine content of aqueous waste streams, especially calcium hypochlorite waste streams. In the process of this reference, the available chlorine content is reduced by chlorinating the impure stream at a temperature in the range of about 80° to 100° C. at a pH in the range of about 5.5 to about 8.5.

During this reaction, the available chlorine is reacted to form the corresponding calcium chlorate.

In U.S. Pat. No. 4,159,929 to Grotheer, a process is disclosed for producing alkali metal chlorates by the reaction of an aqueous solution of an alkali metal chloride, alkali metal chlorate and an alkali metal hypochlorite with an alkali metal hydroxide. Chlorine is added to the reaction mixture in an amount sufficient to maintain the pH of the reaction mixture at about 5–7.5 in order to promote the conversion of alkali metal hypochlorite to alkali metal chlorate. Subsequently, the reaction product is led to an electrolysis cell for the production of an alkali metal chlorate. Instead of feeding brine to the electrolytic sodium chlorate cells, the feed solution is made, for instance, by reacting a sodium hydroxide solution with chlorine at neutral pH to make a weak sodium chlorate solution which is then electrolyzed in electrochemical cells to a strong sodium chlorate solution. Gaseous chlorine is added to the caustic in an in-line mixer at 70°–80° C. in an amount such that the pH of the mixture is controlled at 5.0–7.5. The resulting sodium hypochlorite solution is then held in an aging tank to allow the sodium hypochlorite to convert to sodium chlorate.

In Grotheer, the chlorine and chemical feeds to the process are relatively pure and no provision is made to deal with situations where sodium carbonates may be present, such as tail gases from a methanol type chlorine dioxide generator. The system does not provide any way to purify or handle effluent gases which may emanate from the chlorine/caustic reaction, nor does it show any way to deal with foam which would accompany such gases. Also, the in-line mixer and aging tank are not vented and any gases emanating from the reaction, such as $CO_2$, could create unsafe pressures. Venting these vessels would release chlorine and sodium hypochlorite to the atmosphere, but employing a scrubber would return such gases as $CO_2$ to the system as sodium carbonate or sodium bicarbonate which would build up to the saturation point and shut the process down.

Also, Grotheer does not produce a sodium chlorate solution low enough in sodium hypochlorite concentration to be purified by conventional means, such as ion exchange. This means that dilute sodium hypochlorite solutions, such as would be discharged from a chlorine tail gas scrubber, would not be suitably treated to be, for example, saturated with NaCl and purified for recycle to electrolytic sodium chlorate cells.

In summary, the described process of Grotheer is not able to handle chlorine tail gases or sodium hypochlorite solutions which contain $CO_2$ or sodium carbonate, nor is the process able to produce a sodium chlorate solution which can be recycled in a closed loop system unless the component chemicals are predictably very, pure.

In U.S. 4,216,195 to Jaszka, the production of chlorine dioxide having a low chlorine content is disclosed. A separation technique is utilized in which a gaseous product stream from a chlorine dioxide generator is scrubbed with an aqueous salt mixture containing an approximately stoichiometric quantity of sodium hydroxide. The scrubbing media is a controlled solution of sodium chlorate, sodium chloride and sodium hydroxide which is free of sodium carbonate. The process is not applicable for processing of sodium hypochlorite effluent streams. The sodium hydroxide reacts preferentially with the chlorine in the gas stream, yielding chlorine dioxide of high purity and converting the chlorine to sodium chlorate and sodium chloride which may then be recirculated to a chlorine dioxide generator.

Various processes are disclosed in the prior art for the destruction of an alkali metal hypochlorite, for instance, by reacting an alkali metal hypochlorite with an acid to produce chlorine, U.S. Pat. No. 4,404,179; the reaction of chlorine with hydrazine in U.S. Pat. No. 3,823,225; or the reaction of an alkali metal hypochlorite with urea, U.S. Pat. No. 4,508,697.

In U.S. Pat. No. 4,620,969 to Wilkinson, a process is disclosed for the production of chlorine by the electrolysis of an aqueous solution of sodium chloride. In part of this process, a gaseous stream containing chlorine and carbon dioxide are passed into a first reaction vessel and thence into a second reaction vessel and aqueous sodium hydroxide solution is charged to the first reaction vessel and aqueous sodium hydroxide is separately charged to the second reaction vessel. An aqueous solution containing sodium hypochlorite is removed from the first reaction vessel and an aqueous solution containing sodium carbonate is removed from the second reaction vessel.

In U.S. Pat. No. 4,129,484 to Larsson, a process is disclosed for the utilization of residual solutions obtained from a chlorine dioxide reactor in which sodium chlorate is reduced to chlorine dioxide in the presence of an acid. The residual solutions are converted to sodium chlorate by leading the residual solutions to an electrolytic cell having at the anode region of the cell an acid enriched fraction of the residual solution.

The process of the instant invention is particularly suited for the removal and reuse of the large volumes of alkali or alkaline earth metal hypochlorite produced subsequent to scrubbing the chlorine and carbon dioxide gases produced during the generation of chlorine dioxide by the reduction of an alkali or alkaline earth metal chlorate in the presence of an acid and methanol as a reducing agent. The carbon dioxide is vented to the atmosphere and the an alkali or alkaline earth metal hypochlorite is converted by the process of the instant invention to a dilute solution of an alkali or alkaline earth metal chlorate by reaction with chlorine gas or an acid. If desired, the alkali or alkaline earth metal chlorate can be recycled in a continuous process to an electrolytic cell for the production of an alkali or alkaline earth metal chlorate as a feed for a chlorine dioxide generator.

SUMMARY OF THE INVENTION

A batch or continuous process is disclosed which is particularly suited for the removal and reuse of the large volumes of alkali or alkaline earth metal hypochlorite which are present in an aqueous waste stream subsequent to scrubbing the waste gases, chlorine and carbon dioxide, with an alkali or alkaline earth metal hydroxide. These waste gases are produced in the generation of chlorine dioxide by reducing an alkali or alkaline earth metal sodium chlorate in the presence of sulfuric acid and methanol as a reducing agent. For convenience the alkali or alkaline earth metal salt reactants and products produced in the process of the invention will be exemplified in the description below as sodium salts. One skilled in this art will understand that other alkali metal salts as well as alkaline earth metal salts can be used.

In the process of the invention a waste gaseous stream comprising chlorine and carbon dioxide is converted to an aqueous waste stream mixture, generally, comprising an alkali or alkaline earth metal hypochlorite, carbonate, and chloride, preferably, comprising an alkali metal hypochlorite, carbonate, and chloride, and, most preferably, comprising the sodium salts. Sodium hypochlorite is converted by the process of the invention to sodium chlorate as a dilute aqueous solution which can be utilized as a portion of the feed solution of an electrochemical cell for the production of sodium chlorate. The aqueous waste stream mixture from the chlorine dioxide generator after scrubbing with aqueous sodium hydroxide contains, besides an aqueous sodium hypochlorite, an aqueous solution of a mixture of sodium carbonate, sodium hydroxide, and sodium chloride. In the process of the invention, the carbon dioxide produced is vented to the atmosphere. The remaining components of the aqueous waste stream mixture are converted to an aqueous sodium chlorate, by passing said waste stream components counter-currently to a gaseous mixture derived from subsequent reaction zones. Said gaseous mixture, preferably, comprising an acid gas, and, most preferably, comprising chlorine, carbon dioxide, and water vapor is subsequently reacted at elevated temperature with an acid or an acid gas reactant in at least two successive co-current reaction zones, preferably, in three successive reaction zones. Effluent gases from said reaction zones comprise carbon dioxide, chlorine, and water vapor. The advantages of the use of a gaseous chlorine reactant over the use of an acid is that the sodium chlorate product obtained is not further diluted with water from the acid solution and increased yield of the sodium chlorate product is obtained in accordance with reactions V. and VI.

In the process disclosed, aqueous waste product sodium hypochlorite solutions containing sodium carbonates or chlorine tail gases and carbon dioxide are treated with a chlorine gas reactant in a high temperature co-current reactor in such a way that the sodium hypochlorite and any free alkalinity associated with it are converted to sodium chlorate at a high efficiency, while any sodium carbonates are simultaneously separated and removed as effluent $CO_2$ gas. The effluent $CO_2$ gas is scrubbed free of chlorine in a counter-current reactor by a sodium hypochlorite solution so that the effluent gases exiting the process are essentially free of chlorine and sodium hypochlorite and can be discharged to the atmosphere. The preferred process of the invention comprises the following:

1) The chlorine is scrubbed from the effluent gases with an aqueous sodium hypochlorite scrubber solution.
2) The heat in the effluent gases emanating from the process reactors is used to preheat said scrubber solution while the sodium hypochlorite scrubber solution cools and condenses water vapor and sodium hypochlorite from the effluent gases.
3) The last traces of chlorine from the effluent gases can be removed with an optional reducing agent.
4) Any strong acid can be used as a substitute for said chlorine gas reactant provided that the sodium hypochlorite is converted to sodium chlorate and free alkalinity is converted to sodium chloride or other salts.

Unique advantages of the process of the invention include: Foaming from $CO_2$ liberation is virtually eliminated as a problem and the process works whether sodium carbonate is present or not. A unique pH control system with a single pH control point which allows optimum performance of the whole system is used. Sodium chlorate is made at conversion efficiencies equivalent to those achieved by electrochemical techniques. The sodium chlorate which is made is essentially free of sodium hypochlorite and can be purified by a conventional ion exchange purification process to make a suitable recycle stream so as to avoid the carry over and build-up of impurities such as heavy metals.

A process for the production of chlorine dioxide in a chlorine dioxide reaction zone is also disclosed in which the by-products of said reaction are converted to an aqueous mixture comprising an alkali or alkaline earth metal hypochlorite, carbonate, and chloride and reacted in a scrubbing zone while venting gases comprising carbon dioxide from said scrubbing zone and successively reacting said aqueous mixture from said scrubbing zone in at least a first and second reaction zone with an acid or an acid gas reactant to produce an alkali or alkaline earth metal chlorate and, subsequently, passing said alkali or alkaline earth metal chlorate to an electrolytic cell for the production of an aqueous solution of an alkali or alkaline earth metal chlorate together with an aqueous solution of an alkali or alkaline earth metal chloride. The alkali or alkaline earth metal chlorate product of said electrolytic cell is then passed to said chlorine dioxide reaction zone to complete the process which can be continuous.

BRIEF DESCRIPTION OF THE FIGURES

The objects and advantages of the present invention will be more clearly understood when considered in conjunction with the accompanying drawings, in which.

DETAILED DESCRIPTION OF THE INVENTION

It is a principle object of the present invention to provide a process for the removal and reuse of the large volumes of alkali or alkaline earth metal hypochlorite containing aqueous waste solutions generated in the production of chlorine dioxide, where carbonates may be present. The process is particularly suitable for the treatment of waste gas streams produced in a chlorine dioxide generator in which an alkali or alkaline earth metal chlorate is reacted with an acid and methanol as a reducing agent. An alkali or alkaline earth metal hypochlorite is produced by scrubbing the waste gas stream, containing chlorine and carbon dioxide, with an aqueous solution of an alkali or alkaline earth metal hydroxide.

In the process of the invention, sodium hypochlorite, produced by scrubbing with sodium hydroxide a gas stream containing chlorine and carbon dioxide, can be recycled, after conversion to an aqueous solution of sodium chlorate, to an electrochemical cell for the production of sodium chlorate and utilized in admixture with a brine feed for such an electrochemical cell. For instance, sodium hypochlorite is converted to sodium chlorate by reacting sodium hypochlorite with chlorine gas and/or an acid reactant at elevated temperature and, most preferably, at acid pH conditions. The waste constituents of the aqueous waste stream, after scrubbing with aqueous sodium hydroxide comprise sodium hypochlorite, sodium hydroxide, sodium carbonate, and sodium chloride. The sodium carbonate is converted to carbon dioxide and vented to the atmosphere and the remaining components of the waste aqueous stream are converted to an aqueous solution of sodium chlorate and sodium chloride which can be cycled, if desired, to an electrochemical cell together with brine for the production of sodium chlorate. Alternatively, the aqueous solution of sodium chlorate and sodium chloride produced by the process of this invention can be combined with additional water to provide the water required to dissolve solid sodium chlorate for use as a feed for a chlorine dioxide generator.

Instead of using gaseous chlorine as a reactant in the process of the invention, an acid can be used such as hydrochloric acid or sulfuric acid. However, the use of chlorine gas as a reactant in the process of the invention provides an aqueous sodium chlorate product in higher yield which is not further diluted by the water in the hydrochloric acid or sulfuric acid reactant. In addition, a higher yield of sodium chlorate is obtained in accordance with reactions V. and VI.

DETAILED DESCRIPTION OF THE FIGURES

Figure 1:
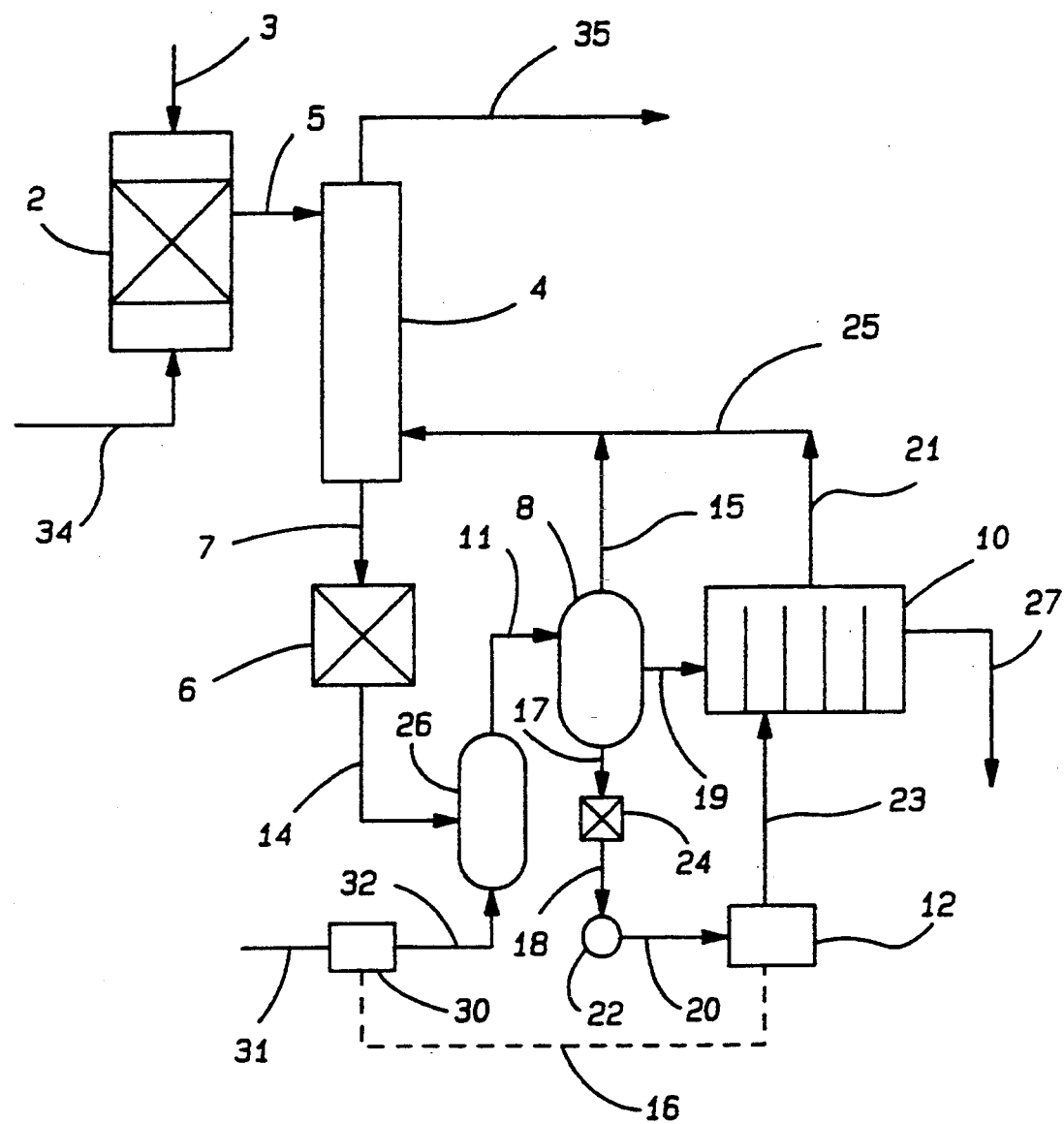
FIG. 1 is a schematic flow sheet illustrating one embodiment of the process of the invention for the conversion of the waste gases chlorine and carbon dioxide to a dilute sodium chlorate solution.

The invention can be readily understood by referring to FIG. 1 which is a schematic flow sheet illustrating one embodiment of the process for conversion of a mixture of waste gases comprising chlorine and carbon dioxide to a dilute aqueous solution of sodium chlorate. In the following description of FIGS. 1–3, sodium chlorate is described as a specific alkali metal chlorate which is produced in the process of the invention. One skilled in this art will understand that the process of the invention is applicable to other alkali metal chlorates as well as alkaline earth metal chlorates. In the embodiment of the process of the invention shown in FIG. 1, the waste gases are first led through line 34 into an aqueous sodium hydroxide scrubber 2. An aqueous solution of sodium hydroxide is led into scrubber 2 through line 3. Said waste gases are converted in scrubber 2 to a mixture of sodium hypochlorite, sodium carbonate and sodium chloride as an aqueous, alkaline solution. This aqueous solution is, thereafter, led through line 5 to the top of a packed bed column 4 in which the aqueous liquid passes downward by gravity while contacting sodium hypochlorite and rising vapors of chlorine, carbon dioxide and water which enter at the bottom of packed bed column 4 through lines 21 and 25 from reaction zone 10 and through line 15 from reaction zone 8. The solution exiting the bottom of the packed bed column 4 is led through line 7 to heat exchanger 6 and thereafter exits through line 14 and is led successively to first reaction zone 26 and then through line 11 to second reaction zone 8. The reaction temperature in reaction zones 26, 8, and 10 is, generally, about 60° C. to about 105° C., preferably, about 85° C. to about 100 ° C. and, most preferably, about 95° C. to about 100° C. The heated liquid is initially reacted in zone 26 with chlorine gas, the amount of which is controlled by pH controller 12 by way of control circuit 16 acting upon chlorine gas controller 30. Chlorine gas enters gas controller 30 through line 31 and exits through line 32. Measurement of the reaction solution pH in second reaction zone 8 is effected by leading a portion of the reaction mixture in reaction zone 8 through lines 17 and 18 and by way of heat exchanger 24, the amount of reaction mixture withdrawn being controlled by pump 22. The reaction mixture is led to pH controller 12 by way of line 20. After pH sampling, the reaction mixture is led to reaction zone 10 through line 23. The converted liquids exit reaction zone 10 through line 27 as dilute, aqueous sodium chlorate solution while gaseous products produced in second reaction zone 8 and third reaction zone 10 are led to the bottom of packed bed column 4 by way of lines 21 and 15, respectively, which join line 25. The gaseous products produced in second reaction zone 8 and third reaction zone 10, carbon dioxide and chlorine, together with sodium hypochlorite and water vapor rise in packed bed column 4 and initially react with the descending sodium hypochlorite, sodium carbonate and sodium hydroxide. Carbon dioxide is released through line 35 to the atmosphere at the top of packed bed column 4 to complete the process. The second reaction zones 8 and the third reaction zone 10 are reaction completion zones.

Figure 2:
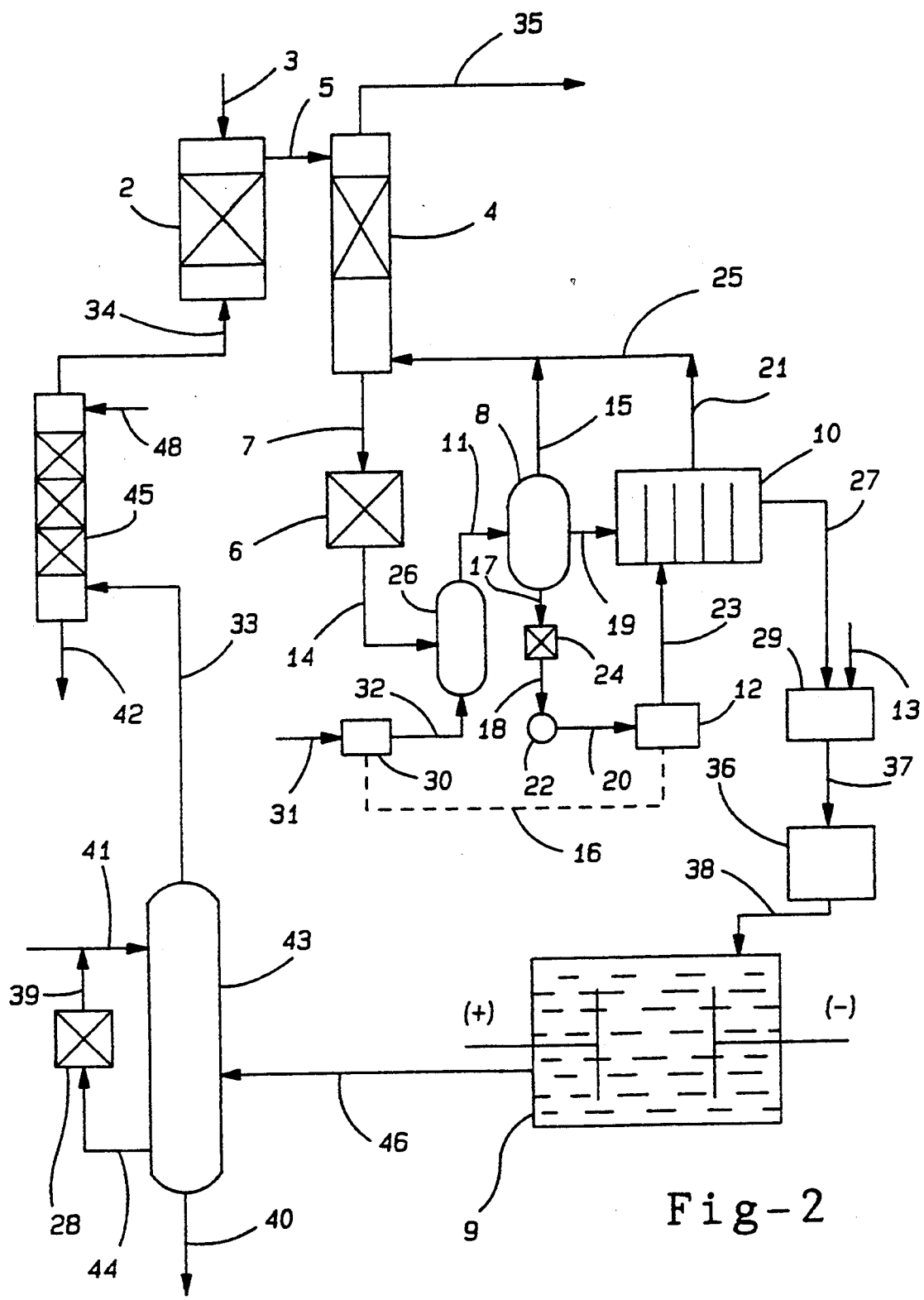
FIG. 2 is a schematic flow sheet illustrating the conversion in a continuous process of the waste gases chlorine and carbon dioxide, produced in a chlorine dioxide generator, to a dilute solution of sodium chlorate; the subsequent leading of this solution into an electrolytic cell; and, thereafter, the conversion of this sodium chlorate solution in the presence of methanol and acid in a chlorine dioxide generator to chlorine dioxide with the subsequent production of more of the waste gases chlorine and carbon dioxide. Expected chemical compounds, chemical reactions and the expected reaction sequence taking place in packed bed scrubber column 4 are illustrated in FIG. 3.

In another aspect of the invention of the instant application, one embodiment of which can be readily understood by referring to FIG. 2, the conversion of the waste gases chlorine and carbon dioxide to a dilute sodium chlorate solution as shown in the schematic flow sheet of FIG. 1, the description of which is incorporated herein, can be combined into a continuous process, as shown in FIG. 2, in which a dilute sodium chlorate solution exiting in line 27 from third reaction zone 10 is led through line 27 to salt saturator 29 and combined therein with a brine solution entering salt saturator 29 in line 13. A saturated salt solution exits salt saturator 29 through line 37 and enters chemical or ion exchange purification zone 36 and thence by line 38 enters an electrolytic cell 9 for the production of sodium chlorate. The aqueous sodium chlorate product solution is led through line 46 from electrolytic cell 9 to chlorine dioxide generator 43. Heat exchanger 28 is used to provide heat for accelerating the reaction in chlorine dioxide generator 43 using lines 44, 39, and 41 to circulate the contents of chlorine dioxide generator 43. A reducing agent and an acid, preferably, methanol and sulfuric acid, are also added through line 41 to chlorine dioxide generator 43. Salt cake is withdrawn from chlorine dioxide generator 43 through line 40 and the remaining products of the reaction, chlorine dioxide, carbon dioxide, chlorine and water vapor exit through line 33 from chlorine dioxide generator 43 to absorber 45 which is fed with chilled water through line 48. Waste gases are led through line 34 to tail gas scrubber 2. Chlorine dioxide is withdrawn through line 42 from absorber 45. The tail gases pass counter-currently to an aqueous solution of sodium hydroxide which enters scrubber 2 through line 3. The waste gases are converted to an aqueous solution of sodium hypochlorite, sodium carbonate, and sodium chloride and are subsequently led through line 5 from scrubber 2 to packed bed column 4 for initial reaction with gases comprising chlorine gas which enters at the base of packed bed column 4 through line 25. Said converted products after reaction are passed through the bottom of packed bed column 4 through line 7 into heat exchanger 6 and thence through line 14 to first reaction zone 26 which is fed with chlorine gas through lines 31 and 32 by way of gas control valve 30, the amount of gas or acid being controlled by pH controller 12 through control circuit 16.

Where bicarbonate is not present, a pH, generally of about 4.0 to about 8.5, preferably, about 5 to about 7, and, most preferably, about 6.4 to about 6.9 is maintained in second reaction zone 8 and third reaction zone 10 by sampling the liquid in second reaction zone 8 through lines 17 and 18 by way of heat exchanger 24 and pump 22. Where bicarbonate is present, the pH in second reaction zone 8 may be controlled at a lower pH than the resulting pH of the third reaction zone 10, for example, if the bicarbonate concentration in line 11 is 5 gpl, the pH control range in second reaction zone 8 would be 4.0 to 6.0 and preferably, 4.8 to 5.2. Said liquid is led through line 20 to pH controller 12. After sampling, said liquid is returned through line 23 to third reaction zone 10. The contents of first reaction zone 26 are led through line 11 subsequent to an initial reaction to second reaction zone 8 and then through line 19 to a third reaction zone 10 in which the reaction is completed. Gases produced in reaction zones 8 and 10 are withdrawn through lines 15 and 21, respectively, for return to packed bed column 4 by way of line 25. In third reaction zone 10, a dilute sodium chlorate solution which is produced is withdrawn through line 27.

It is noted that the gaseous products produced in second reaction zone 8 and third reaction zone 10, namely, carbon dioxide, chlorine, and water vapor, provide chlorine as a reactant for the initial reaction with the sodium hypochlorite, sodium carbonate, and sodium hydroxide aqueous solution passing downwardly through packed bed column 4. The carbon dioxide entering at the bottom of packed bed column 4 ultimately is vented through the top of packed bed column 4 to the atmosphere through line 35.

Figure 3:
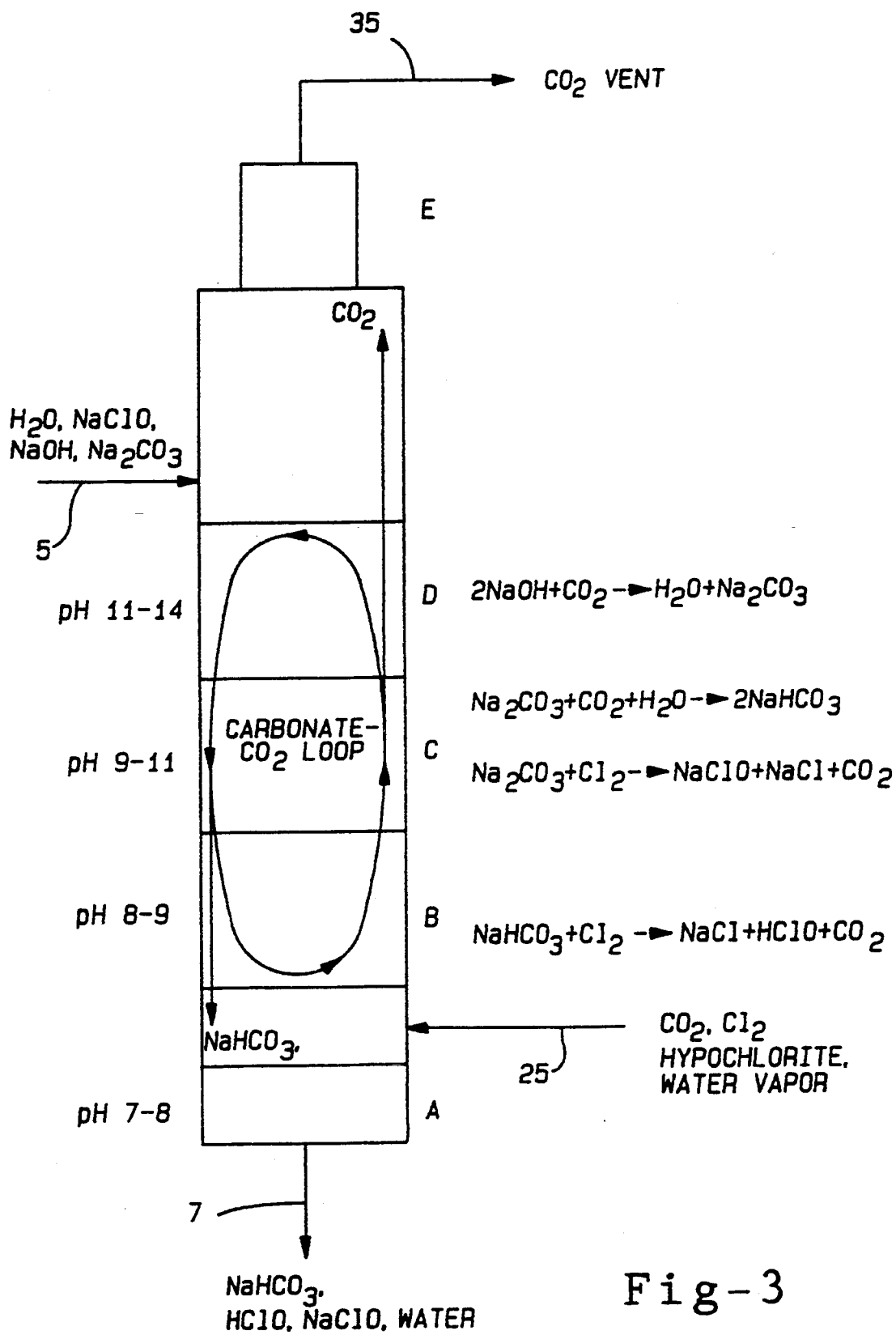

The mainly sodium hypochlorite aqueous solution entering packed bed column 4 through line 5 in FIGS. 1-3 may be any concentration and does not have to be pure. The sodium hypochlorite solution may be alkaline and may contain sodium chloride, sodium chlorate, carbon dioxide, sodium carbonate or sodium bicarbonate in any combination up to the saturation point. Where the compounds are in the sodium form, the maximum sodium ion concentration would be 5.4 gm-moles/liter with a preferred range of 1.0–4.0 gm-mole/liter. The pH of the sodium hypochlorite solution is normally between 11 and 14, although other pH's are possible. There is no temperature limitation on the entering sodium hypochlorite solution, although a temperature of about 10° to about 30° C. is preferred. The source of the sodium hypochlorite may be from chlorine scrubbers in sodium chlorate plants, chlorine plants, or chlorine dioxide generators, as shown in FIG. 2, water treatment plants, etc. Optionally, chlorine gas mixed with compounds such as air, hydrogen or carbon dioxide may be reacted with any suitable caustic solution fed via line 3 to any suitable scrubber column 2. The reactions taking place in reaction zones 26, 8, and 10 are as follows:

$$NaHCO_3 + Cl_2 \rightarrow HClO + NaCl + CO_2 \qquad X.$$

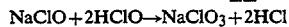  XI.

$$NaClO + 2HClO \rightarrow NaClO_3 + 2HCl$$

A unique aspect of the process of the invention is that a single pH control point controls the overall performance of the system. Good pH control is necessary to achieve optimum performance, which, generally, is achieved when the pH of the final weak sodium chlorate solution exiting from second reaction zone 10 is in the most preferred pH range of about 6.4 to about 6.9. The pH is controlled, generally, by adding chlorine gas or acid to reaction zone 26 via line 32, and measuring the pH in reaction zone 8. The addition of the preferred chlorine gas reactant to reaction zone 8 lowers the pH. The desired pH control range in reaction zone 8 to achieve optimum performance is dependent on the composition of the sodium hypochlorite feed solution, the temperature of the sodium hypochlorite feed solution, and the specific engineering design of the system. In systems where some sodium bicarbonate is still present in the sodium hypochlorite solution entering reaction zone 10 via line 19, the sodium bicarbonate will cause the pH in reaction zone 10 to go up and, accordingly, the pH control range in reaction zone 8 has to be set proportionally lower. For example, if the sodium bicarbonate concentration in line 19 is 5 gpl, the pH control range in second reaction zone 8 would be, preferably, about 4 to about 6 and, most preferably, about 4.8 to about 5.2. If no sodium bicarbonate is present, the pH control range in second reaction zone would, preferably, be about 5 to about 7 and, most preferably, be about 6.4 to about 6.9.

The method of controlling the pH by adjusting the flow of chlorine gas or acid into one vessel and then measuring the pH in a different vessel, thereby intentionally introducing measurement lag time, is an unconventional method of pH control. Conventionally, the pH of a chemical system is measured as close as possible to the point of chemical mixing. Otherwise conventional systems become insensitive to changes in chemical feed rate and run out of control. Applying conventional methods to the present system would put the pH measurement and control point in first reaction zone 26. However, pH control in reaction zone 26 was found to be unachievable because of the violent evolution of gas and foam, and also because even small changes in the chlorine feed rate, or of the pH of the incoming sodium hypochlorite solution, cause large and rapid pH fluctuations in reaction zone 26. In reaction zone 8, the foam and gases are dissipated and short term pH fluctuations are damped out by the larger volume of solution. Measurement lag time unexpectedly turns out not to be a problem because of the nature of the system, as described below.

If chlorine is added in excess relative to the amount of incoming sodium bicarbonate in the sodium hypochlorite solution entering reaction zone 26, the chlorine enters reaction zone 8 via line 11 with the gas liquid mixture leaving reaction zone 26. Hypochlorous acid and hydrochloric acid are made which lowers the pH. If chlorine is added in further excess, the excess from reaction zone 8 enters packed bed column 4 through lines 15 and 25. This lowers the pH of the sodium hypochlorite solution feeding reaction zone 26 and further lowers the pH in reaction zone 8. If too little chlorine is added relative to the amount of incoming sodium bicarbonate present in the sodium hypochlorite solution, excess unreacted sodium bicarbonate is carried into reaction zone 8. This neutralizes the acidity and immediately raises the pH in reaction zone 8. The overall effect of adding chlorine or acid to reaction zone 26 and measuring the pH in reaction zone 8 is that there is unexpectedly no apparent measurement lag time, and pH control over the whole system is easily achieved.

If there is a loss of pH control such that there is a continued excess of chlorine coming into the system, a low pH condition will develop at the bottom of packed bed column 4 and work its way to the top of packed bed column 4, until chlorine starts to discharge from the system with the vent gases. If there is a loss of pH control, and there is a continued deficiency of chlorine coming into the system, the pH in reaction zone 8 and reaction zone 10 will increase so that the weak sodium chlorate solution discharging from reaction zone 10 will be alkaline and will contain substantial amounts of sodium carbonate and unreacted sodium hypochlorite.

Because of the high temperatures and sodium hypochlorite normally present in reaction zone 8, pH measurement is done in a cooled, continuous external stream. Hot sodium hypochlorite solution is pumped from the reaction zone 8 via line 17 through heat exchanger 24 and then through lines 18 and 20 by way of pump 22 to pH probe and transmitter 12 and then returned to reaction zone 10 by way of line 23. Heat exchanger 24 cools the sodium hypochlorite solution to a temperature not less than the saturation point of the solution, usually between about 5° C. to about 40° C. The pH probe and transmitter 12 control the rate of chlorine or acid addition through control circuit 16 and valve 30 so that the desired pH in reaction zone 8 is achieved.

The weak sodium chlorate solution exiting from reaction zone 10 via line 27 can be evaporated to concentrate the salts prior to adding to a sodium chlorate electrochemical cell, or added directly to a sodium chlorate cell or to a chlorine dioxide generator. If metal contaminants are present, the solution can be purified by any suitable chemical means, such as ion exchange. If ion exchange resins are used as purification means, any residual sodium hypochlorite can be removed, if necessary, with an optional dehypochlorination agent before feeding to an ion exchange column. Examples of dehypochlorination agents are urea, sodium sulfite, hydrogen peroxide, etc.

In FIG. 3, one embodiment of packed bed column 4 is shown. Zones A–E are shown. A sodium hypochlorite feed solution is introduced into Zone D through line 5 and moves by gravity from zone D through A where it exits the packed bed column 4 via line 7. Gaseous effluents, such as $CO_2$, are introduced into Zone A via line 25 from reaction zone 10 and reaction zone 8 and move counter-currently to the sodium hypochlorite solution from Zone A through E so that they are cleaned of chlorine.

Zones B, C, and D can be packed with any suitable packing material. Ceramic saddles are preferred. The packing density is, generally, about 3% to about 50%, preferably, about 5% to about 15%, and, most preferably, about 8% to about 11%. The space above Zone D is not packed. This allows the sodium hypochlorite solution and the optional reducing agent to be introduced into the packed bed column 4 by any suitable means.

Effluent gases in packed bed column 4 move counter-currently to the sodium hypochlorite solution. Carbon dioxide in the effluent gases will react with free caustic in the sodium hypochlorite solution in Zone D according to the reaction:

$$CO_2 + 2NaOH \rightarrow Na_2CO_3 + H_2O \qquad \text{XII.}$$

The free caustic in the sodium hypochlorite solution is removed and the sodium carbonate concentration is increased so that the pH of the sodium hypochlorite solution leaving Zone D and entering Zone C will be approximately 9–11. Wider pH ranges can be used. The sodium hypochlorite solution cools the effluent gases and condenses out water vapor and trace amounts of sodium hypochlorite in Zone D. The contact time and temperature of the sodium hypochlorite solution can be optimized for maximum condensation.

Effluent gases from Zone D can be treated with an optional reducing agent to react with the last traces of chlorine and sodium hypochlorite in the effluent gases. Any suitable reducing agent such as sodium sulfite, urea, hydroxylamine, or hydrogen peroxide can be used, but the optional reducing agent should not be reactive with $CO_2$. Sodium sulfite has been found to be effective. The reaction is as follows:

$$Cl_2 + Na_2SO_3 + H_2O \rightarrow H_2SO_4 + 2NaCl \qquad \text{XIII.}$$

The optional reducing agent should only be used in small quantities approximately equivalent to the trace amounts of chlorine and sodium hypochlorite in the effluent gases, otherwise it could destroy some of the sodium hypochlorite in the sodium hypochlorite feed solution and possibly contaminate the system. The optional reducing agent can also be added in a separate scrubber, thus isolating the reducing agent from the process.

Effluent gases move through Zone E containing a mist eliminator and thence to the atmosphere through line 35. In this zone liquid droplets, which may contain sodium hypochlorite, are removed. The final effluent gases are essentially free of chlorine and sodium hypochlorite and can be safely removed from the system, although chlorine levels up to 3 ppm weight/volume can be present.

Sodium hypochlorite solution from Zone D enters Zone C by gravity. In this zone, any chlorine remaining in the effluent gases is removed by the carbonate present in the sodium hypochlorite solution in accordance with the reaction:

$$Na_2CO_3 + Cl_2 \rightarrow NaClO + NaCl + CO_2 \qquad \text{XIV.}$$

Carbon dioxide in the effluent gases also reacts with sodium carbonate in accordance with the reaction:

$$Na_2CO_3 + CO_2 + H_2O \rightarrow 2NaHCO_3 \qquad \text{XV.}$$

Most of the sodium carbonate is converted to sodium bicarbonate in Zone C and the pH of the sodium hypochlorite solution leaving Zone C and entering Zone B will be approximately 8–9. Wider pH ranges can be used. The sodium hypochlorite solution also cools the effluent gases and condenses out water vapor and sodium hypochlorite in Zone C.

Sodium hypochlorite solution from Zone C enters Zone B by gravity. In this zone, most of the chlorine in the effluent gases is removed by the sodium bicarbonate present in the sodium hypochlorite solution according to the reaction:

$$NaHCO_3 + Cl_2 \rightarrow HClO + NaCl + CO_2 \qquad XVI.$$

The pH of the sodium hypochlorite solution leaving Zone B and entering Zone A will be approximately about 7 to about 8. Wider pH ranges can be used. The sodium hypochlorite solution also cools the effluent gases and condenses out water vapor and sodium hypochlorite in Zone B.

Sodium hypochlorite solution from Zone B enters Zone A by gravity. Zone A provides a discharge point for the sodium hypochlorite solution and an entry point for the effluent gases. It remains partially filled with sodium hypochlorite solution at a level sufficient to maintain a hydraulic head sufficient to maintain flow through the downstream heat exchanger and reaction zones. The effluent gases from reaction zones 8 and 10 are introduced via line 25 above the liquid level in the gas space.

The following Examples illustrate the various aspects of the invention but are not intended to limit its scope. Where not otherwise specified throughout this specification and claims, temperatures are given in degrees centigrade and parts, percentages and proportions are by weight/volume.

EXAMPLE 1

This example is described with reference to FIGS. 2 and 3. The packed bed column 4 was made of clear plastic pipe sold under the trade name LEXAN. Two different kinds of packing were used in each of the packed sections B, C and D. The packing density was 25–40%. Demister section E was packed with glass wool.

A synthetic sodium hypochlorite solution containing 1.7 gpl sodium hydroxide, 10.6 gpl sodium chlorate, 34.3 gpl sodium chloride, 40.6 gpl sodium carbonate, and 39.1 gpl sodium hypochlorite was fed through line 5 to the top of scrubber column 4 at a flow rate of 96.4 ml/min. The synthetic sodium hypochlorite solution used was made from an aqueous sodium hypochlorite sold under the trade name CHLOROX, reagent grade $Na_2CO_3$, NaOH, and tap water. The solution moved through the column from Zone D through Zone A by gravity. The sodium hypochlorite solution was flowed by gravity through the rest of the system and flow was maintained on a continuous basis. The pH of the sodium hypochlorite solution was 12.5 entering scrubber column 4 via line 5, and ranged from 7.4 to 7.7 exiting scrubber column 4 via line 7.

The sodium hypochlorite solution was flowed via line 7 through heat exchanger 6, and then into reaction zone 26 via line 14, by gravity. The sodium hypochlorite solution was heated in heat exchanger 6 so that the temperature in reaction zone 26 was 94° C. Reaction zone 26 was made of clear plastic pipe sold under the trade name LEXAN. Chlorine was injected at the bottom of the reaction zone 26 via line 32.

An immediate reaction between the chlorine and sodium hypochlorite solution took place which caused the evolution of gas and foam. This was easily observed in the clear plastic pipe reaction zone 26. The sodium hypochlorite solution/foam/gas mixture travelled co-currently through reaction zone 26 and the mixture appeared visually to be homogeneous. By measurement, the liquid component of the mixture occupied ⅔ of the volume of reaction zone 26, and the gas component ⅓ of the volume.

The liquid/foam/gas mixture exited from the top of reaction zone 26 via line 11 to reaction zone 8. Reaction zone 8 was a 2" diameter, 40" long piece of titanium pipe. Effluent gases were withdrawn from the top of reaction zone 8 via line 15 and led by way of line 25 to Zone A of packed bed column 4. It was observed that foam or liquid was carried with the effluent gases into column 4.

The sodium hypochlorite solution was withdrawn from reaction zone 8 via line 19 and led to reaction zone 10 by gravity. Reaction zone 10 consisted of a train of four 2 pinch diameter×36 inch long titanium pipes connected so that the, sodium hypochlorite solution flowed from the first pipe to the last pipe in the train, and then out as a weak sodium chlorate solution into a catch tank via line 27 by gravity. The train was heated to 97° C.–98° C. by a water bath. Total retention time in the train was 51 minutes.

The feed rate of chlorine gas to the system was controlled by manually regulating a needle valve made of a plastic sold under the trade name TEFLON so that the pH in reaction zone 8 was maintained at an average of 6.4. The pH control range was 5.0 to 7.2. The pH was measured with a glass combination electrode at pH probe and transmitter 12 in external pH sampling loop encompassing lines 17, 18, 20, and 23, heat exchanger 24, pump 22, and pH probe and transmitter 12.

The test was run continuously for 8.6 hrs. over which time 50 liters of the synthetic sodium hypochlorite feed solution was processed to a weak sodium chlorate solution. The conversion efficiency to sodium chlorate was 98% based on the available sodium hypochlorite and alkalinity of the original feed solution. The final weak sodium chlorate solution withdrawn from reactor 10 via line 27 had an average pH of 6.1, and, by analysis, consisted of 0.82 gpl NaClO, 0 gpl $Na_2CO_3$, 40.6 gpl $NaClO_3$, and 89.4 gpl NaCl. The total chlorine and sodium hypochlorite level in the effluent gases discharging from packed bed column 4 averaged 0.91 ppm (mg/liter), expressed as $Cl_2$. The range was 0.83–1.08 ppm. These levels were not detectable by smell, indicating that most of the chlorine was probably present as sodium hypochlorite mist getting through demister zone E. Lower chlorine levels would be achieved with better mist eliminating equipment. Summarizing Example 1:

| | | EXAMPLE 1 | | | |
|---|---|---|---|---|---|
| | | Hypochlorite Feed Solution | Zone A of Scrubber Column 4 | Reaction Zone 8 | Weak Chlorate Recycle |
| NaClO | (gpl) | 39.1 | 24–29 | | 0.8 |
| $NaClO_3$ | (gpl) | 10.4 | | | 40.7 |
| NaCl | (gpl) | 34.2 | | | 89.4 |
| $Na_2CO_3$ | (gpl) | 40.6 | | | 0.0 |
| NaOH | (gpl) | 1.7 | | | 0.0 |
| pH | | 12.5 | 7.4–7.7 | 5.0–7.2 | 6.1 |
| Temp. | (°C.) | Ambient | | 94 | 97–98 |
| Chlorate Conversion Eff. | % | 98.0 | | | |
| $Cl_2$ in Discharging Gases | (ppm) | 0.91 | | | |
| Duration of test | (Hrs) | 8.6 | | | |

EXAMPLE 2

The process of Example 1 was repeated but with a variation of the constituents in the scrubber solution as follows:

EXAMPLE 2

|  |  | Hypochlorite Feed Solution | Zone A of Scrubber Column 4 | Reaction Zone 8 | Weak Chlorate Recycle |
|---|---|---|---|---|---|
| NaClO | (gpl) | 39.3 |  | 3.5 | 1.2 |
| NaClO$_3$ | (gpl) | 1.3 |  |  | 37.1 |
| NaCl | (gpl) | 37.4 |  |  | 109.4 |
| Na$_2$CO$_3$ | (gpl) | 50.9 |  |  | 0.0 |
| NaOH | (gpl) | 9.8 |  |  | 0.0 |
| pH |  | 12.9 |  | 4.9–6.5 | 5.4 |
| Temp. | (°C.) | Ambient | 60 | 90 | 97–98 |
| Chlorate Conversion Eff. | % | 92.0 |  |  |  |
| Cl$_2$ in Discharging Gases | (ppm) | 1.60 |  |  |  |
| Duration of test | (Hrs) | 8.7 |  |  |  |

EXAMPLE 3

The process of Example 1 was repeated but with a variation of the constituents in the scrubber solution and process conditions as follows:

EXAMPLE 3

|  |  | Hypochlorite Feed Solution | Zone A of Scrubber Column 4 | Reaction Zone 8 | Weak Chlorate Recycle |
|---|---|---|---|---|---|
| NaClO | (gpl) | 39.7 |  |  | 0.9 |
| NaClO$_3$ | (gpl) | 1.3 |  |  | 36.0 |
| NaCl | (gpl) | 36.2 |  |  | 105.1 |
| Na$_2$CO$_3$ | (gpl) | 41.9 |  |  | 0.0 |
| NaOH | (gpl) | 9.8 |  |  | 0.0 |
| pH |  | 12.7 | 7.0–8.0 | 4.6–8.0 | 6.2 |
| Temp. | (°C.) | Ambient |  | 88 | 96–97 |
| Chlorate Conversion Eff. | % | 95.7 |  |  |  |
| Cl$_2$ in Discharging Gases | (ppm) | 1.49 |  |  |  |
| Duration of test | (Hrs) | 8.7 |  |  |  |

In this example at start up, all vessels were filled with the sodium hypochlorite feed solution of Example 3 and the system was run under non-equilibrium 'upset' conditions until equilibrium was established in the CO$_2$/sodium carbonate; loop in the scrubber column. Under 'upset' conditions pH fluctuations are fairly broad. After equilibrium conditions are established, the pH is controlled in the range of 6 to 7 yielding optimum performance for the system.

EXAMPLE 4

The process of Example 1 was again repeated but with the exception that 3M hydrochloric acid was used to acidify the system rather than chlorine gas:

EXAMPLE 4

|  |  | Hypochlorite Feed Solution | Zone A of Scrubber Column 4 | Reaction Zone 8 | Weak Chlorate Recycle |
|---|---|---|---|---|---|
| NaClO | (gpl) | 36.4 |  |  | 1.23 |
| NaClO$_3$ | (gpl) | 2.7 |  |  | 13.6 |
| NaCl | (gpl) | 38.1 |  |  | 82.1 |
| Na$_2$CO$_3$ | (gpl) | 41.0 |  |  | 0.0 |
| NaOH | (gpl) | 9.8 |  |  | 0.0 |
| pH |  | 13.0 |  | 1.5–5.5 | 5.0 |
| Temp. | (°C.) | Ambient |  | 82 | 85–90 |
| Chlorate Conversion Eff. | % | 96.8 |  |  |  |
| Cl$_2$ in Discharging Gases | (ppm) | 0.98 |  |  |  |
| Duration of test | (Hrs) | 5.8 |  |  |  |

Note that the final product is more dilute because of the water fed in with the HCl.

EXAMPLE 5

The process of Example 1 was again repeated but with the exception that 1.5M sulfuric acid was used to acidify the system rather than chlorine gas as follows:

EXAMPLE 5

|  |  | Hypochlorite Feed Solution | Zone A of Scrubber Column 4 | Reaction Zone 8 | Weak Chlorate Recycle |
|---|---|---|---|---|---|
| NaClO | (gpl) | 35.1 |  |  | 0.9 |
| NaClO$_3$ | (gpl) | 3.5 |  |  | 13.0 |
| NaCl | (gpl) | 39.7 |  |  | 40.3 |
| Na$_2$CO$_3$ | (gpl) | 42.1 |  |  | 0.3 |
| NaOH | (gpl) | 10.0 |  |  | 0.0 |
| pH |  | 13.2 |  | 4.4–6.5 | 6.0 |
| Temp. | (°C.) | Ambient |  | 92 | 90–95 |
| Chlorate Conversion Eff. | % | 91.8 |  |  |  |
| Cl$_2$ in Discharging Gases | (ppm) | 1.17 |  |  |  |
| Duration of test | (Hrs) | 6.3 |  |  |  |

Note that the final product is more dilute because of the water fed in with the sulfuric acid.

EXAMPLE 6

In a separate experiment, the effluent gases discharging from packed bed column 4 via line 35 were bubbled from an open ended ¼" I.D. tube through a 3" deep volume of 50 gpl sodium sulfite solution (Na$_2$SO$_4$) to remove the last trace amounts of chlorine and sodium hypochlorite. The chlorine concentration in the effluent gases was analyzed at 1.0 ppm Cl$_2$ before bubbling through the sodium sulfite solution, and 0.0 ppm afterwards.

EXAMPLE 7

In a separate experiment, the effluent gases discharging from packed bed column 4 via line 35 were bubbled from an open ended ¼" I.D. tube through a 3" deep volume of 50 gpl urea $CO(NH_2)_2$ solution to remove the last trace amounts of chlorine and sodium hypochlorite. The chlorine concentration in the effluent gases was analyzed at 1.3 ppm $Cl_2$ before bubbling through sodium sulfite solution, and 0.6 ppm afterwards.

While this invention has been described with reference to certain specific embodiments, it will be recognized by those skilled in the art that many variations are possible without departing from the scope and spirit of the invention and it will be understood that it is intended to cover all changes and modifications of the invention disclosed herein for the purposes of illustration which do not constitute departures from the spirit and scope of the invention.

The invention in which an exclusive property or privilege is claimed is defined as follows:

1. A process for producing a dilute, aqueous solution of an alkali metal or alkaline earth metal chlorate from a gaseous waste stream comprising chlorine and carbon dioxide, said process comprising:
    A) contacting in a first scrubbing zone, said gaseous waste stream with an alkali metal or alkaline earth metal hydroxide to produce a first aqueous mixture comprising an alkali metal or alkaline earth metal hypochlorite, carbonate, and chloride, thereafter
    B) converting in a second scrubbing zone said first aqueous mixture by passing said first aqueous mixture counter-currently to effluent gases comprising an acid gas generated in step C to obtain a second aqueous mixture comprising an alkali metal or alkaline earth metal hypochlorite and bicarbonate, thereafter
    C) reacting said second aqueous mixture comprising an alkali metal or alkaline earth metal hypochlorite and bicarbonate at about 60° C. to about 105° C. together with an acid or an acid gas selected from the group consisting of hydrochloric acid, sulfuric acid, and chlorine in a reaction zone and successively completing said reacting at said temperature to produce a chlorate and effluent gases while supplying said effluent gases to step B and, thereafter
    D) recovering from step C a dilute, aqueous solution comprising an alkali metal or alkaline earth metal chlorate.

2. The process of claim 1 wherein said second aqueous mixture is reacted together with chlorine to produce a chlorate and effluent gases.

3. The process of claim 2 wherein said effluent gases from step C of claim 1 comprise carbon dioxide, chlorine and water vapor.

4. The process of claim 3 comprising successively completing the reaction in at least one reaction completion zone at a temperature of about 85° C. to about 100° C.

5. The process of claim 4 wherein the pH in said at least one reaction completion zone is maintained at about 5 to about 7 by controlling the amount of chlorine admitted to said reaction zone.

6. The process of claim 5 wherein sodium chlorate is recovered.

7. In a process for the production of chlorine dioxide, comprising
    A reducing an aqueous alkali metal or alkaline earth metal chlorate with an aqueous inorganic acid and methanol in a chlorine dioxide production zone, the improvement comprising:
    B converting by-products of said process comprising chlorine and carbon dioxide in a first scrubbing zone by reaction with an aqueous alkali metal or alkaline earth metal hydroxide to produce a first aqueous mixture comprising an alkali metal or alkaline earth metal hypochlorite, carbonate, and chloride, thereafter
    C converting in a second scrubbing zone said first aqueous mixture with effluent gases generated in step D to obtain a second aqueous mixture comprising an alkali metal or alkaline earth metal hypochlorite and bicarbonate and venting effluent gases comprising an acid gas and carbon dioxide from said second scrubbing zone, thereafter
    D reacting at elevated temperature said second aqueous mixture with an acid or an acid gas selected from the group consisting of hydrochloric acid, sulfuric acid, and chlorine in a reaction zone and successively completing the reaction in at least one reaction completion zone to produce a chlorate and effluent gases while supplying said effluent gases to step C and recovering said chlorate as a dilute, aqueous mixture comprising an alkali metal or alkaline earth metal chlorate. thereafter
    E passing said alkali metal or alkaline earth metal chlorate together with an aqueous alkali metal or alkaline earth metal chloride to an electrochemical cell for the production of an aqueous alkali metal or alkaline earth metal chlorate, and thereafter
    F passing a product of said cell comprising an aqueous alkali metal or alkaline earth metal chlorate to step A.

8. The process of claim 7 wherein said acid gas is chlorine and said at least one reaction zone is maintained at a pH of about 5 to about 7.

9. The process of claim 8 wherein said second aqueous mixture is converted to an alkali or alkaline earth metal chlorate and carbon dioxide.

10. The process of claim 9 wherein said pH is maintained at about 5 to about 7 by controlling the amount of said chlorine admitted to said reaction zone of Step (D).

11. The process of claim 10 wherein said alkali metal chlorate is sodium chlorate.

12. The process of claim 11 wherein said process is continuous.

13. A process for producing a dilute, aqueous solution of sodium chlorate from a waste gaseous stream comprising chlorine and carbon dioxide, said process comprising:
    (A) passing said waste gaseous stream counter-currently to an aqueous mixture of sodium hydroxide in a first scrubbing zone to produce a first aqueous mixture comprising sodium hypochlorite, sodium carbonate, and sodium chloride, thereafter
    (B) passing said first aqueous mixture counter-currently to effluent gases generated in step C to obtain a second aqueous mixture comprising sodium hypochlorite and sodium bicarbonate and, thereafter
    (C) reacting said second aqueous mixture with chlorine at about 85° C. to about 100° C. in a reaction zone and successively completing the reaction in at least one reaction completion zone to produce sodium chlorate and effluent gases wherein said at least one reaction completion zone is maintained at a pH of about 6.4 to about 6.9 by controlling the amount of chlorine admitted to said reaction zone and recycling said effluent gases comprising chlorine, carbon dioxide, and water vapor from said at least one reaction completion zone to said second scrubbing zone and recovering from said at least one reaction completion zone a dilute, aqueous solution comprising sodium chlorate.

14. The process of claim 13 wherein said process is continuous.

* * * * *